Dec. 10, 1963  F. KHOL  3,113,381
APPARATUS FOR EVALUATING X-RAY DIFFRACTION RECORDS
Filed June 2, 1958  4 Sheets-Sheet 1

INVENTOR.
František Khol
BY

Dec. 10, 1963  F. KHOL  3,113,381
APPARATUS FOR EVALUATING X-RAY DIFFRACTION RECORDS
Filed June 2, 1958  4 Sheets-Sheet 2
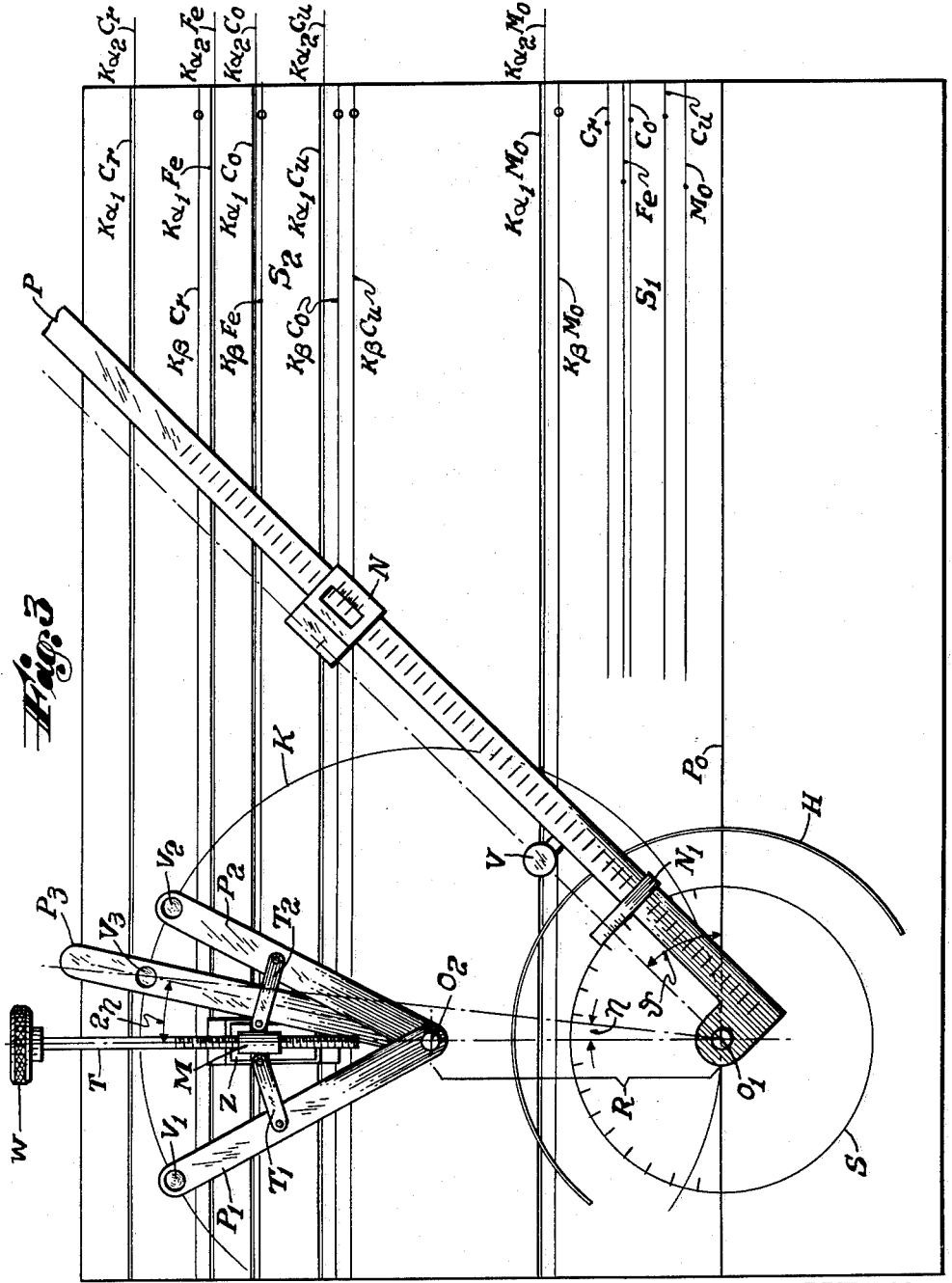
INVENTOR.
František Khol
BY

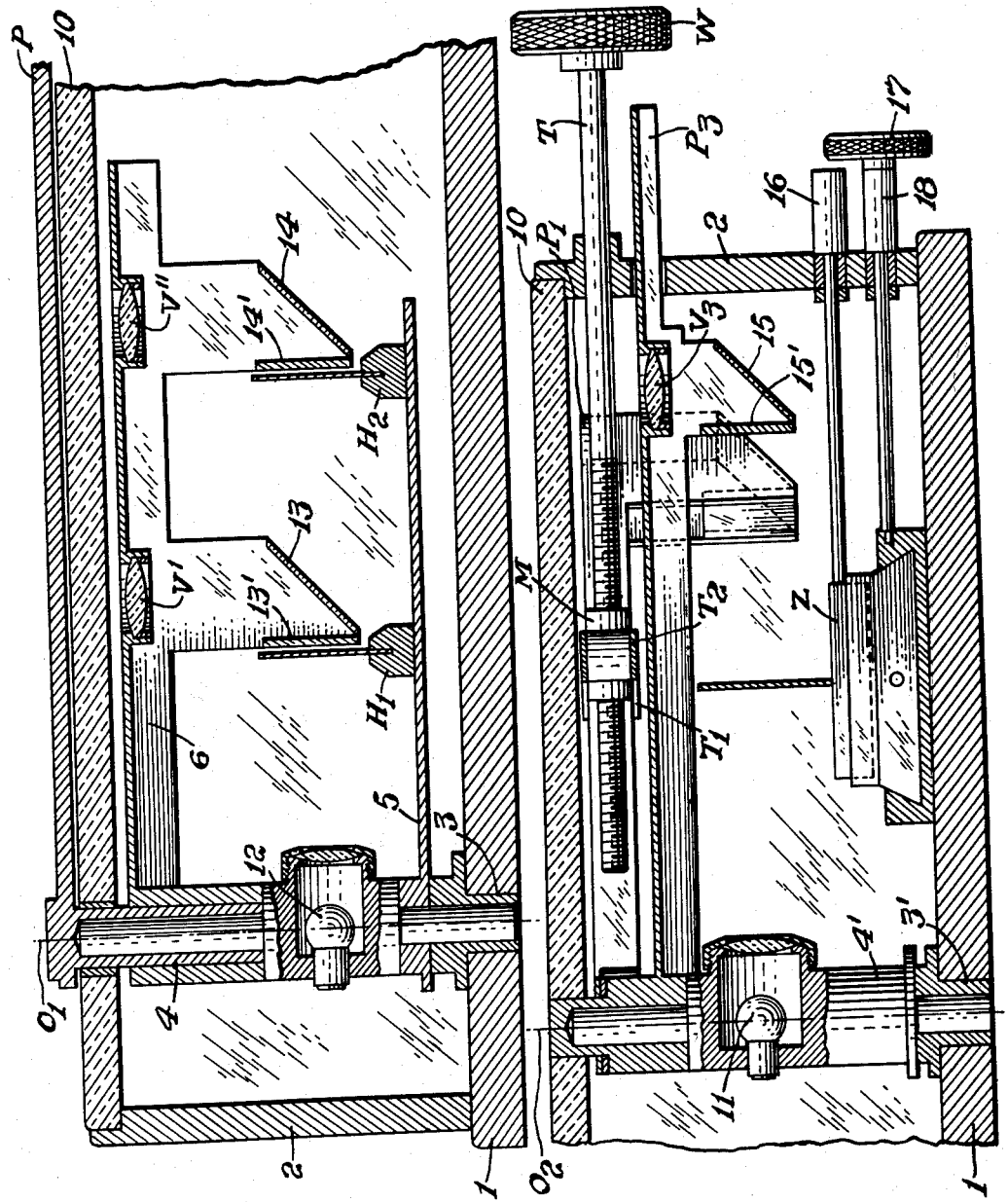

Dec. 10, 1963 F. KHOL 3,113,381
APPARATUS FOR EVALUATING X-RAY DIFFRACTION RECORDS
Filed June 2, 1958 4 Sheets-Sheet 4
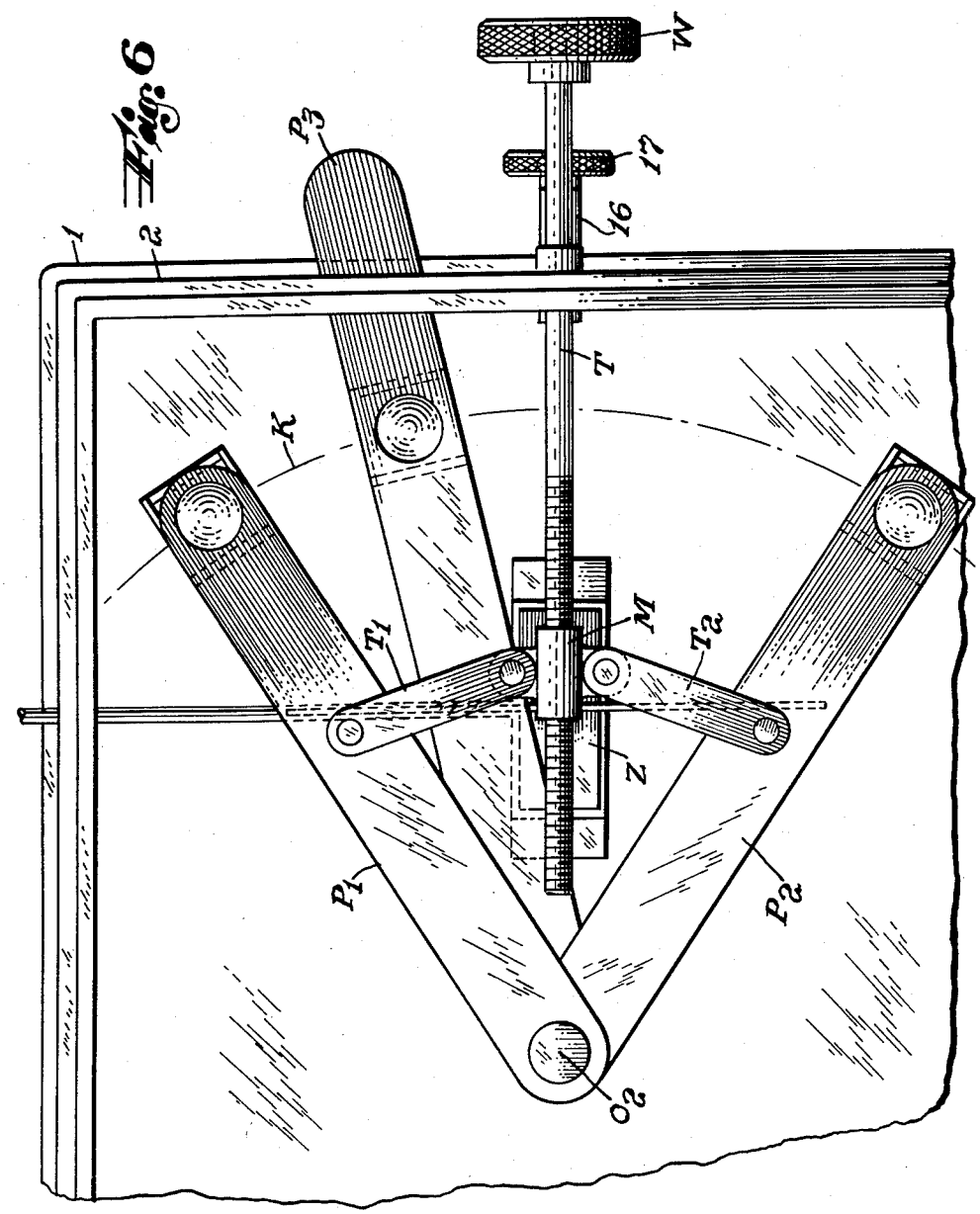
INVENTOR.
František Khol
BY

3,113,381
APPARATUS FOR EVALUATING X-RAY DIFFRACTION RECORDS
František Khol, 834 Safarikova, Lysa nad Labem, Czechoslovakia
Filed June 2, 1958, Ser. No. 739,432
Claims priority, application Czechoslovakia May 31, 1957
3 Claims. (Cl. 33—1)

This invention relates to apparatus for evaluating X-ray diffraction records.

For the determination of the structural parameters of polycrystalline materials, an X-ray diffraction record from the material to be analyzed is produced by X-ray radiation of a predetermined wavelength, and such record has heretofore been taken either in accordance with the Debye-Sherrer method or according to the back reflection method. The lattice distances or parameters are then determined from the position of the interference lines on the record. For an approximate determination of these distances, certain rules are used which are established for various wavelengths of characteristic radiations and for different diameters of the diffraction chambers used.

In the case of an X-ray diffraction record obtained by the Debye-Sherrer method, the precise values $d$ of the lattice distances are calculated according to Bragg's equation which defines the dependence of the lattice distances on the wavelength $\lambda$ of the characteristic radiation applied, as well as on the position of the interference lines expressed by the angle $\vartheta$. The equation is $$d = \frac{\lambda}{2 \sin \vartheta}$$

The positions of the interferences corresponding to the angles $\vartheta$ are measured on the record by means of a transilluminating comparator with a precision of 0.05 to 0.10 mm. The structural parameters of the sample of material which is being analysed are ascertained by comparing the calculated values $d$ with the values stated in published tables.

The measurement of the angle $\vartheta$ as well as the calculation of the lattice parameters $d$ are time-consuming and intricate, and the results are, therefore, often faulty.

The evaluation of X-ray diffraction records obtained by the back reflection method also requires high precision of measurement and intricate calculations to precisely determine lattice constants or intrinsic tensions.

In the United States Patent No. 2,945,300 an apparatus appears disclosed which enables lattice distances $d$ to be established directly from a diffraction record taken according to the Debye-Sherrer method without the necessity of measuring the angle $\vartheta$, and without making time-consuming calculations in accordance with the formula given hereinbefore or finding for every angle measured the corresponding value $d$ in charts showing the dependence of the lattice distances on the angle $\vartheta$ for different wavelengths of the X-ray radiation applied. The diffraction record is inserted in the apparatus so that it is positioned against the inner wall of a transluminating chamber whose radius is equal to the diameter of the diffraction chamber that is used for taking the diffraction record. A rule is pivoted in a point in the axis of the transluminating chamber to be in any position closely to the surface of a measuring plate. The scale of the rule begins at its pivot point. On adjusting this scale to any interference line visible in the sight, the scale will form with its initial zero-position an angle $\vartheta$ and make the reading of the chosen multiple of the respective lattice distance $d$ possible as the distance of the pivot axis of the rule from the point of intersection of the scale with the straight line marked on the measuring plate of the apparatus. The straight line is parallel to the basic position of the scale ($\vartheta = 0$) a distance apart which equals the same multiple by a predetermined factor of one half of the wavelength of the characteristic radiation applied.

The field of application of the apparatus of the aforeindicated patent has, due to the present invention, been substantially widened. The apparatus of the present invention operates entirely mechanically and does away with time-consuming and tiresome calculations. It permits ascertainment of the lattice distances $d$ by evaluating X-ray diffraction records made not only by the Debye-Sherrer method but also by the back reflection method or any other method used in the structural analysis of polycrystallin materials. It permits at the same time making corrections for the absorption of radiation by the sample of material analysed.

The specification is accompanied by drawings in which:

FIG. 3 is a top plan view of an apparatus embodying features of the invention; and FIGS. 4 and 5 show the apparatus of FIG. 3 in side-elevational section taken in the plane through the axis $O_1$ and $O_2$, respectively, and FIG. 6 shows a detail of FIG. 3 on an enlarged scale.

The position of the interference lines on diffraction records is expressed by the angle $\vartheta$ or by the complementary angle $\eta = 90° - \vartheta$. When the angle $\eta$ is substituted for the angle $\alpha$ in the well known Bragg equation, the equation assumes the form $$\cos \eta = \frac{\lambda}{2d}$$

Figure 1:
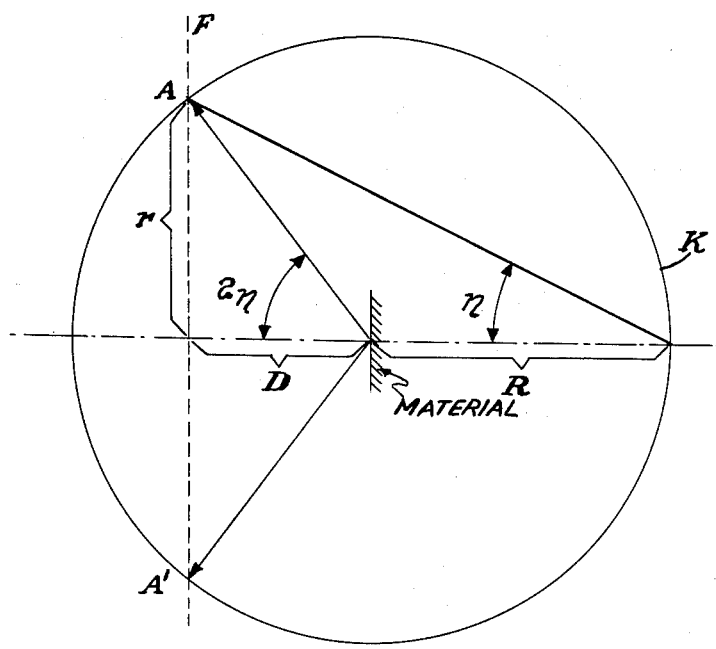
FIG. 1 is a diagram of the geometric principle underlying the apparatus of the invention.

In the evaluation of diffraction records obtained in accordance with the back reflection method, the angle $2\eta$ is determined from the relationship $$\tan 2\eta = \frac{r}{D}$$

wherein $r$ is the radius of the interference circle, and D the distance of the film from the material sample. These geometrical values are represented in FIG. 1. The angle $\eta$ appears in FIG. 1 as a circumferential angle whose apex lies in the circle K having the radius $R = \sqrt{r^2 + D^2}$ and a center determined by the position of the sample, said center being at the same time the apex of the corresponding central angle $2\eta$. With the angle $\eta$ established, the lattice parameter is derived from the relationship $$d = \frac{\lambda}{2 \cos \eta}$$

On a diffraction record obtained by the back reflection method it is necessary to take both the interference $r$ of the material analysed and the interference $r_r$ of a reference substance, for instance, pure gold or silver. For both of these interferences, i.e., $\eta$ and $\eta_r$, the following relations are valid:

$$\cos \eta_r = \frac{\lambda}{2d_r}$$

$$\cos \eta = \frac{\lambda}{2d}$$

Figure 2:
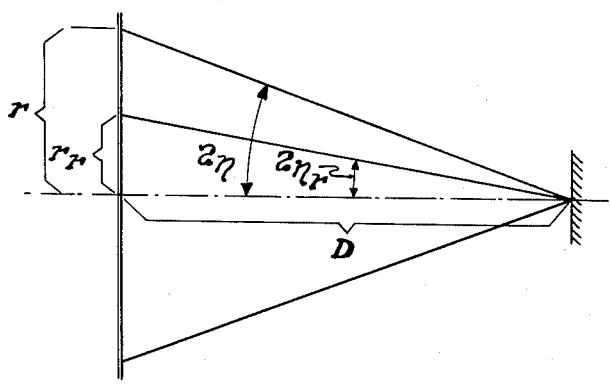
FIG. 2 is explanatory of the relation between the diffraction lines of standard material and the measured material.

The magnitude of the angles $\eta_r$ and $\eta$ can be determined from relations which are evident from FIG. 2:

$$\tan 2\eta_r = \frac{r_r}{D}$$

$$\tan 2\eta = \frac{r}{D}$$

$$\tan 2\eta = \frac{r}{r_r} \cdot \tan 2\eta r$$

An embodiment of my improved apparatus is shown, by way of example, in FIG. 3. This construction differs from that disclosed in the referred to Patent 2,945,300 mainly in that in addition to a rule P pivotally mounted about an axis $O_1$ above a measuring plate of the apparatus, three further arms $P_1$, $P_2$ and $P_3$ are mounted underneath the measuring plate to be pivotable about an axis $O_2$. The axis $O_2$ passes through the plane of the measuring plate in a point of a straight line which intersects the axis $O_1$ and is perpendicular to the basic position $P_0$ of the rule P. The points in which the axes $O_1$ and $O_2$ pass through the measuring plate are a distance R apart, this distance being the radius of a circle K about the axis $O_2$, which intersects the axis $O_1$. The movement of the arms $P_1$ and $P_2$ is controlled by links $T_1$ and $T_2$ each of which is hinged at one end to the respective arm and at the other end to a sleeve M. This sleeve is threadedly mounted on a guide rod T the longitudinal axis of which lies in the plane that is defined by the axes $O_1$ and $O_2$. When the sleeve M is axially shifted on and along the guide rod T by turning a knob W, both arms $P_1$ and $P_2$ are simultaneously pivoted about the axes $O_2$ so that they will make equal angles with the aforementioned plane which is defined by the axes $O_1$ and $O_2$ and is perpendicular to the measuring plate and to the basic position $P_0$ of the rule P. The free ends of the arms $P_1$ and $P_2$ move along the circle K.

In FIG. 4, there is shown a bottom 1 of a box on and in which the apparatus is mounted. The box has a side wall 2 and a top which constitutes a transparent measuring plate 10. The axis $O_1$ passes through the center of a bearing 3 mounted in the bottom 1. The rule P has an integral shaft 4 supported in the bearing 3. A support plate 5 is rotatable on the shaft 4 about the axis $O_1$ and is parallel to the measuring plate 10. It carries several movable holders $H_1$, $H_2$, etc. which normally define circles about the axis $O_1$ and whose radii are correlated to the conventional standard radii of curvature of recording film in X-ray diffraction apparatus using cylindrically curved films.

An arm 6 integral with the plate 5 carries as many sights as there are film holders H of which two are shown in FIG. 4. Each sight consists of a magnifying lens V', V'', and a mirror 13, 14, the latter being inclined to reflect the image of a portion of an X-ray diffraction record on the respective holder H to the measuring plate 10. The image is projected on a screen 13', 14' which is preferably of a bluish tinge by an electric bulb 12 that provides a point source of light in the axis $O_1$.

FIG. 5 shows a shaft 4' which is supported in a bearing 3' and on which the arms $P_1$, $P_2$, and $P_3$ are pivoted about the axis $O_2$. A holder Z beneath the measuring plate, which takes flat X-ray diffraction records is shifted toward and away from the axis $O_2$ by means of an actuating knob 17 which may be alternatingly attached to a drive rod 16 for so moving the holder Z, or to a drive rod 18 for actuating movements of the holder Z in a direction perpendicular to the plane defined by the axes $O_1$ and $O_2$.

A bulb 11 mounted in a recess of the shaft 4' on the axis $O_2$ illuminates the diffraction record mounted on the holder Z for viewing through a sight consisting of a bluish screen 15', an inclined mirror 15, and a magnifying lens $V_3$ mounted on the arm $P_3$. The arms $P_1$ and $P_2$ are similarly equipped with screens, mirrors, and lenses.

Thus, besides several circular holders H into which are inserted diffraction records taken in cylindrical chambers of different diameters, e.g., 57.4, 114.8 mm., there is a holder Z for mounting diffraction records taken according to the back reflection method. The holder Z has the same shape as the chamber wherein the diffraction record has been taken and is adapted, as has been indicated, to be shifted in directions toward and away from the axis $O_2$ and perpendicular to the plane of the axes $O_1$ and $O_2$.

On the rule P and the pivoted arms $P_1$, $P_2$, and $P_3$ is fixed a sight V, $V_1$, $V_2$, and $V_3$, respectively (see FIG. 3), having a magnifying power two to five times. The selected interference line is viewed through the sights, and the pivoted arms are aligned precisely by means of the knob W acting on the guide rod T, the sleeve M, and the links $T_1$ and $T_2$. The rule P may be similarly adjusted by means of a screw arrangement (not shown). The position of the selected interference line is determined by the angle $\eta$ which is measured on the angular scale S attached to the axis $O_1$, the exact value being read on the vernier N fixed on the rule P.

FIG. 6 shows a detail of the apparatus to enlarged scale. Two systems $S_1$ and $S_2$ of straight lines are marked on the measuring plate parallel to the basic position $P_0$ of the rule P (see again FIG. 3) at distances which are proportional to the wavelengths λ of the characteristic radiations $K\alpha_1$, $K\alpha_2$, and $K\beta$ of different anodes, for instance, Mo, Cu, Co, Fe, Cr. The straight lines may be provided by filaments made to adhere to the underside of the measuring plate. More specifically, the distance of the straight lines in the systems $S_1$ and $S_2$ from the basic position $P_0$ of the rule P are multiples by a predetermined factor of one half of the respective wavelength. The rule P is provided with a scale in linear units which are multiples by said predetermined factor of the units of the parameters to be determined. This scale has its zero position in the axis $O_1$ and is provided, in addition to the sight V, with a vernier for a slidable alignment with the respective straight line of the systems $S_1$ and $S_2$. The zero point is adjusted to the respective straight line. The lattice parameter $d$ is read on the scale as the distance between the axis $O_1$ and the point of intersection of a straight measuring line on the vernier N and a particular straight line of the systems $S_1$ or $S_2$. If a unit on the scale corresponds to the unit for measuring the lattice distance $d$ in the system $S_1$, five units of the same scale will correspond to the unit for measuring the lattice distance in the system $S_2$, the distances of the straight lines of the system $S_2$ from the basic position of the rule P being five times the distances regarding the analogous lines in the system $S_1$, as far as the same wavelength is concerned. It is possible to provide for each of the systems $S_1$ and $S_2$ a separate and individual scale.

The system $S_1$ is used for measuring large lattice distances $d$ corresponding to small angles $\vartheta$. The values of such distances are read on the scale of the rule $P_1$ the zero point of whose vernier is adjusted to the straight line in the system $S_1$, that pertains to the applied characteristic radiation. The straight lines pertaining to the wavelengths of the radiations $K\alpha_1$ and $K\alpha_2$ in the system $S_1$ nearly coincide and are therefore shown as a single line, whereas these lines in the system $S_2$ are individually shown, a distance apart which corresponds to one-half the difference in the wavelengths. The precision of the determination of the lattice distances by means of the present apparatus is higher than that of the diameters stated in the ASTM tables. Small values of the angle $\vartheta$ can be measured with a precision of 0.1%, greater values with a precision of 1%.

The method of evaluating X-ray diffraction records obtained by the Debye-Sherrer method are described in the above referred to Patent 2,945,300.

When working according to the Yevins-Straumanis asymmetric method, diffraction records are inserted in a holder having a diameter twice that of the chamber in which the record was taken. By sliding the holder in a direction $\vartheta=45°$ from the axis $O_1$ and by pivoting same about the same axis, the record is set precisely in a position in which the center of one set of symmetrical diffraction lines coincides with the basic position of the straight measuring line of the rule P, $\vartheta=0$, and the center of the other set of symmetrical diffraction lines with the perpendicular line $O_1$, $O_2$, $\vartheta = 90°$. The position of the symmetrical diffraction lines are read on the graduation S by means of the vernier $N_1$.

The rule P is turned into such a position that the locating mark of the sight V is aligned with the interference line, whereupon the position of the rule is secured and the vernier is so adjusted that its zero point lies on the straight line which in the system $S_1$ or in the system $S_2$ pertains to that wavelength of radiation causing the interference. The lattice parameter $d$ sought is then read on the corresponding graduation of the rule P.

When evaluating X-ray diffraction records of metal wires or powdered samples enclosed in a tube, it is necessary to take the shifting of the positions of the interference lines through the influence of the radiation absorption in the sample into account.

In order to determine the correct value of the lattice parameter $d$ it is necessary to correct the measured value $\vartheta$ to the real value $\vartheta$ cor. or to substitute in Bragg's equation for the real wavelength $\lambda$ the corrected wavelength $\lambda$ cor. The necessary correction is the greater the smaller the angle $\vartheta$ is, that is, the greater the lattice parameter is, and depends on the radius of the sample measured. On the apparatus described, the correct values of the lattice distances $d$ can be determined on the basis of the measured angles $\vartheta$ if the wavelengths $\lambda$ are corrected by pivoting the filaments marking the straight lines in the system $S_1$ and $S_2$ about their points of intersection with the vertical line for $\vartheta = 90°$. The angle of their inclination relatively to the horizontal line for $\vartheta = 0$ which defines the necessary correction for a known radius of the sample used can be preadjusted on the apparatus.

Diffraction records taken in accordance with the black reflection method having recorded thereon both interference $r$ of the substance being measured and the interference $r_r$ of a reference substance are inserted in the holder Z. The value of the known lattice distance $d_r$ of the chosen reference substance is adjusted on the rule P by means of the vernier N, and the rule is then turned in such a way that the zero point of the vernier lies on that straight line which in the system $S_2$ corresponds to the wavelength of the radiation applied, for instance, $Kd_1$. After securing the rule P against angular displacement, the vernier N is shifted so as to locate the zero point of the vernier on the circle K. By shifting the threaded sleeve M the arms $P_1$ and $P_2$ are angularly displaced so that the center of the sight provided on the arm $P_2$ coincides with the zero point of the vernier N on the circle K. Thus, the angle $2\eta_r$ which remains constant for the whole series of X-ray diffraction records taken with the same reference substance and the same characteristic radiation has been determined.

The holder Z with a diffraction record inserted therein is adjusted by shifting in the direction $O_1$, $O_2$ so as to align the interference $r_r$ (see FIG. 2) of the reference substance in the sights $V_1$ and $V_2$ with the cross lines. Any eccentricity occurring is eliminated by shifting the holder in a plane perpendicular to the direction $O_1$, $O_2$. The arm $P_3$ is adjusted so that the cross lines in its sight $V_3$ coincide with the interference $r$ of the unknown substance or the structural component which is to be determined, and the rule P is pivoted so as to bring the measuring straight line marked on the vernier N to pass through the point of intersection of the axis of the arm $P_3$ with the circle K, i.e. through the center of the sight $V_3$. By shifting thereupon the zero point of the vernier N to the line corresponding to the wavelength of the radiation $K_1$ in the system $S_2$ it is possible to read on the scale of the rule P directly the lattice parameter $d$ pertaining to the interference $r$. The accuracy of the determination of this value depends on the sharpness of the interference on the diffraction record analysed as well as on the enlargement of the apparatus.

*Example*

A specific example of the method of using the apparatus of the invention is described hereinafter:

An X-ray diffraction record is obtained from a sample of steel by the back reflection method using an X-ray tube with a cobalt anode and including the interference line (013) of iron. Gold is employed as a standard, and the interference line (024) of gold is recorded. The record is evaluated as follows:

(1) The vernier N on the rule P is set for the $d$-value of gold: $d = 0.9101$ A. $(d = \pi/2 \sin \vartheta)$.

(2) The rule P is set in such a position that the zero line of the vernier coincides with the line $$CoK\alpha (\lambda = 1.785287 \text{ A.})$$

in system $S_2$.

(3) The vernier N is shifted until its zero line coincides with the circular line of movement of the sights $V_1$, $V_2$, $V_3$. The arms $P_1$ and $P_2$ are adjusted by means of the knob W so that the sight $V_2$ coincides with the intersection of the circle K with the straight line defined by the rule P.

(4) The back reflection record is clamped in the holder Z and is positioned symmetrically with respect to the line $O_1$, $O_2$ and the holder is then shifted along that line until the interference line of gold (024) is centered in the sights $V_1$, $V_2$.

(5) The arm $P_3$ is adjusted until the interference line (013) is seen.

(6) The rule P is positioned in such a manner that it intersects the arm $P_3$ on the circle K.

(7) The vernier N is shifted on the rule P to the intersection with the line in the system $S_2$ which corresponds to the radiation CoK$\alpha$, and the desired lattice parameter $d_{Fe} = 0.9048$ A. of the interference line (013) is read from the arm $P_2$.

The apparatus of my invention also permits evaluation of X-ray diffraction records which have been taken according to other modifications of the back reflection method if an appropriately adapted holder is used. The holder for a diffraction record, for instance, from a conical container has the shape of an identical transparent cone. The holder has to have the same shape as the film container used for taking the diffraction record.

It will be apparent that while I have shown and described my invention in a single form only many changes and modifications may be made without departing from the spirit of the invention defined in the appended claims.

What is claimed is:

1. In an apparatus for evaluating an X-ray diffraction record produced by X-ray radiation of a predetermined wavelength from a material the structural parameters of which are to be determined, in combination, a support defining a flat surface; a marking defining a straight line on said surface; an elongated rule mounted on said support for pivoting movement about a first axis perpendicular to said surface toward and away from a basic angular position parallel to said straight line; a scale on said rule, the zero point of said scale being on said axis, and said scale being in linear units, the distance of said straight line from said basic position in said surface being a multiple by a predetermined factor of one half of said wavelength, and said units being multiples by said predetermined factor of the units in which said parameters are to be determined; sight means on said rule; three arms mounted on said support for pivotal movement about a second axis parallel to said first axis and spaced therefrom in a direction perpendicular to said basic position by a predetermined distance; sight means on each of said arms and spaced from said second axis by said predetermined distance; means for pivoting two of said arms about said second axis symmetrically relative to a plane defined by said first and second axes; and a holder on said support for holding a diffraction record in a position substantially circumferential relative to said axes and spaced from said second axis in said direction by a distance smaller than said predetermined distance.

2. In an apparatus for evaluating an X-ray diffraction record, in combination, a support defining a flat surface; an elongated rule mounted on said support for pivoting movement about a first axis perpendicular to said surface toward and away from a basic angular position; three arms mounted on said support for pivotal movement about a second axis parallel to said first axis and spaced therefrom in a direction perpendicular to said basic position by a predetermined distance; sight means on each of said arms and spaced from said second axis by said predetermined distance; means for pivoting two of said arms about said second axis symmetrically relative to a plane defined by said first and said second axis; and a holder on said support for holding a diffraction record in a position substantially circumferential relative to said axes and spaced from said second axis in said direction by a distance smaller than said predetermined distance.

3. In an apparatus for evaluating an X-ray diffraction record produced by X-ray radiation of a predetermined wavelength from a material the structural parameters of which are to be determined, in combination, a support defining a flat surface; a marking defining a straight line on said surface; an elongated rule mounted on said support for pivoting movement about a first axis perpendicular to said surface toward and away from a basic angular position parallel to said straight line; a scale on said rule, the zero point of said scale being on said axis, and said scale being in linear units, the distance of said straight line from said basic position in said surface being a multiple by a predetermined factor of one half of said wavelength, and said units being multiples by said predetermined factor of the units in which said parameters are to be determined; sight means on said rule; vernier means slidable on said rule for alignment with said straight line; three arms mounted on said support for pivotal movement about a second axis parallel to said first axis and spaced therefrom in a direction perpendicular to said basic position by a predetermined distance; sight means on each of said arms and spaced from said second axis by said predetermined distance; means for pivoting two of said arms about said second axis symmetrically relative to a plane defined by said first and second axes; and a holder on said support for holding a diffraction record in a position substantially circumferential relative to said axes and spaced from said second axis in said direction by a distance smaller than said predetermined distance.

References Cited in the file of this patent
UNITED STATES PATENTS
2,332,391 McLachlan _____ Oct. 19, 1943

OTHER REFERENCES

Pages 368–372 of Applied X-Rays by Geo. L. Clark, Fourth edition, 1955, published by McGraw-Hill Book Co., N.Y. (Copy in Scientific Library QC 481 C47.)